March 5, 1963 W. D. LUDWIG 3,079,951
ROTARY SOLENOID FOUR-WAY VALVE
Filed Nov. 1, 1960 6 Sheets-Sheet 2
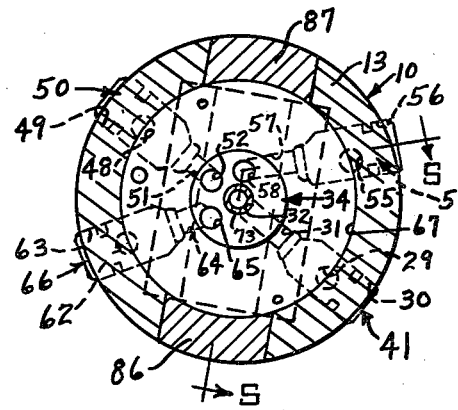
Fig. 4
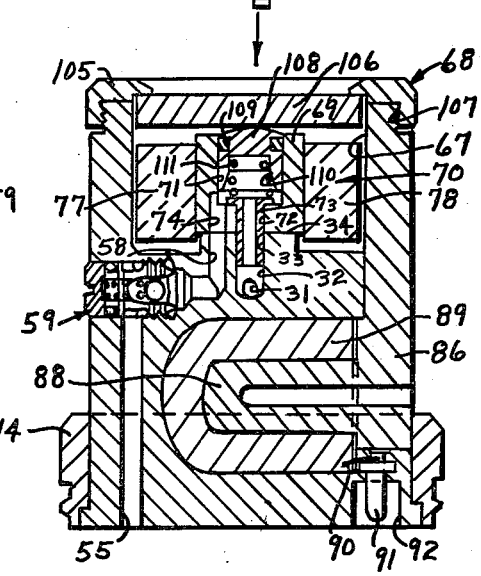
Fig. 5
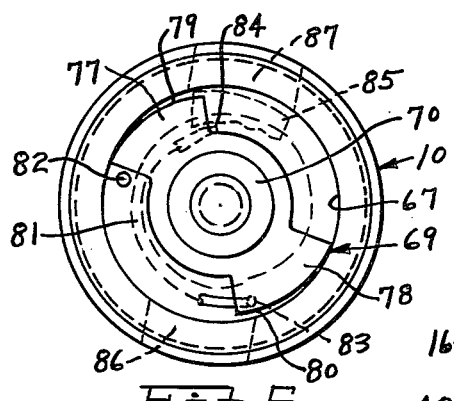
Fig. 6
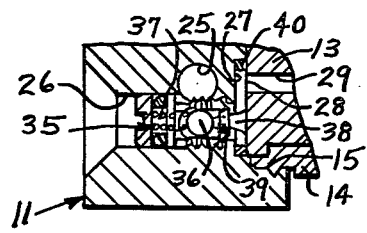
Fig. 9
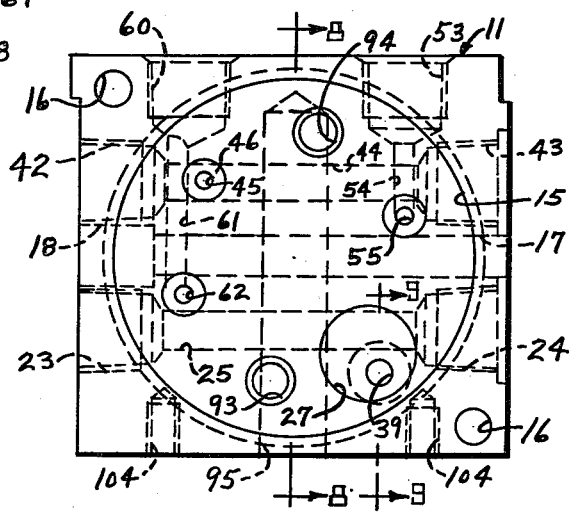
Fig. 7
Fig. 10
INVENTOR.
WALTER D. LUDWIG
BY
Donnelly, Mentag & Harrington
ATTORNEYS March 5, 1963 W. D. LUDWIG 3,079,951
ROTARY SOLENOID FOUR-WAY VALVE
Filed Nov. 1, 1960 6 Sheets-Sheet 3
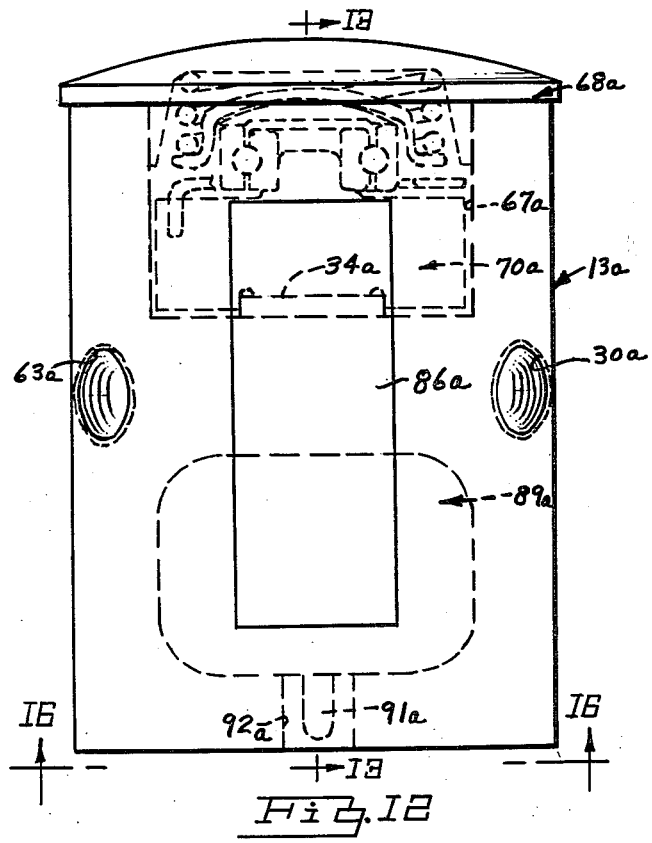
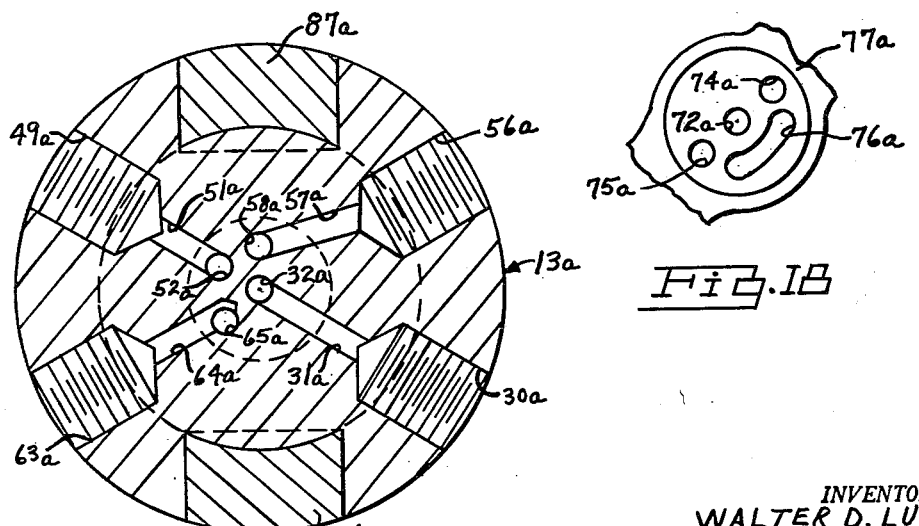
INVENTOR.
WALTER D. LUDWIG
BY
Donnelly, Mentag & Harrington
ATTORNEYS

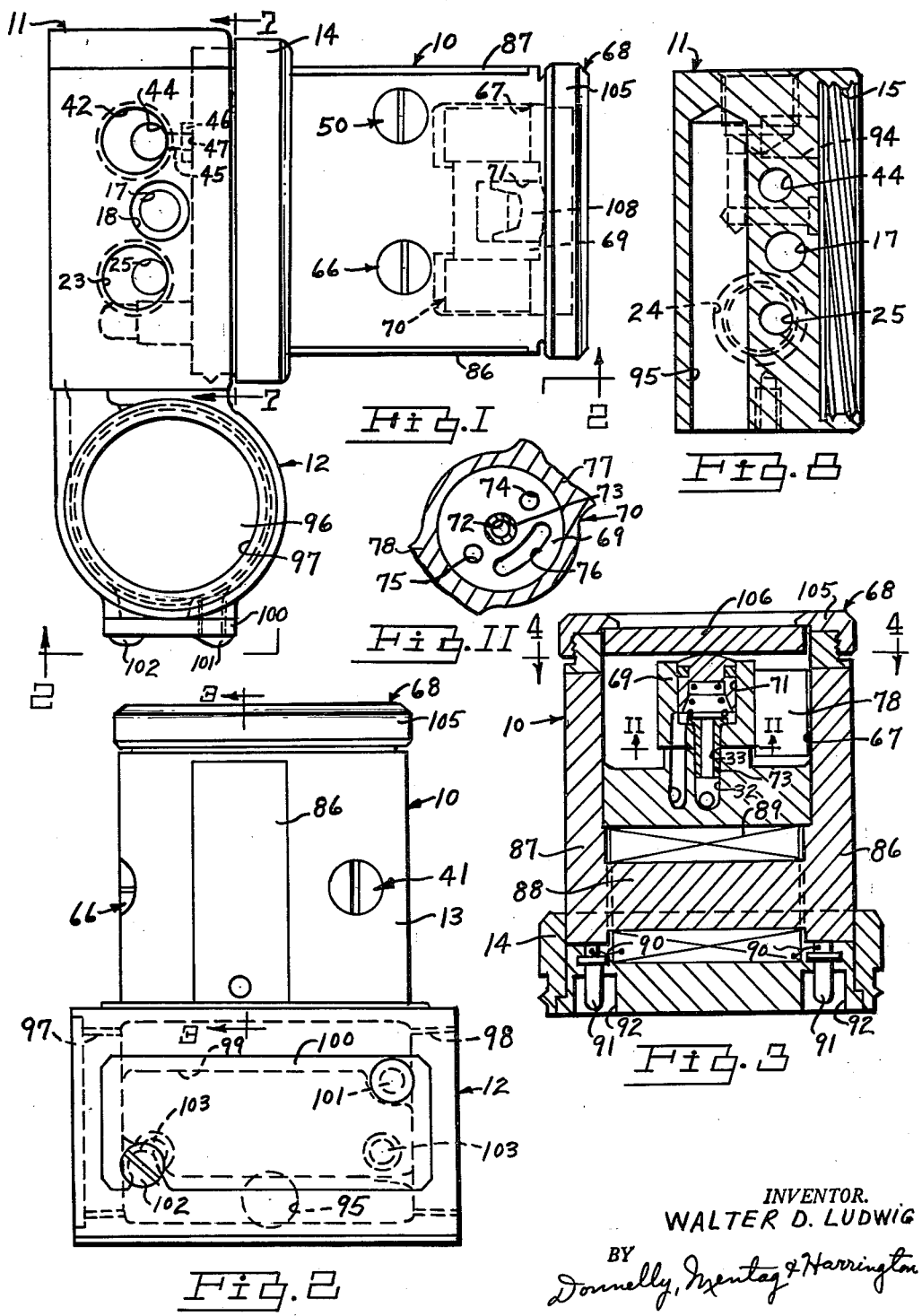

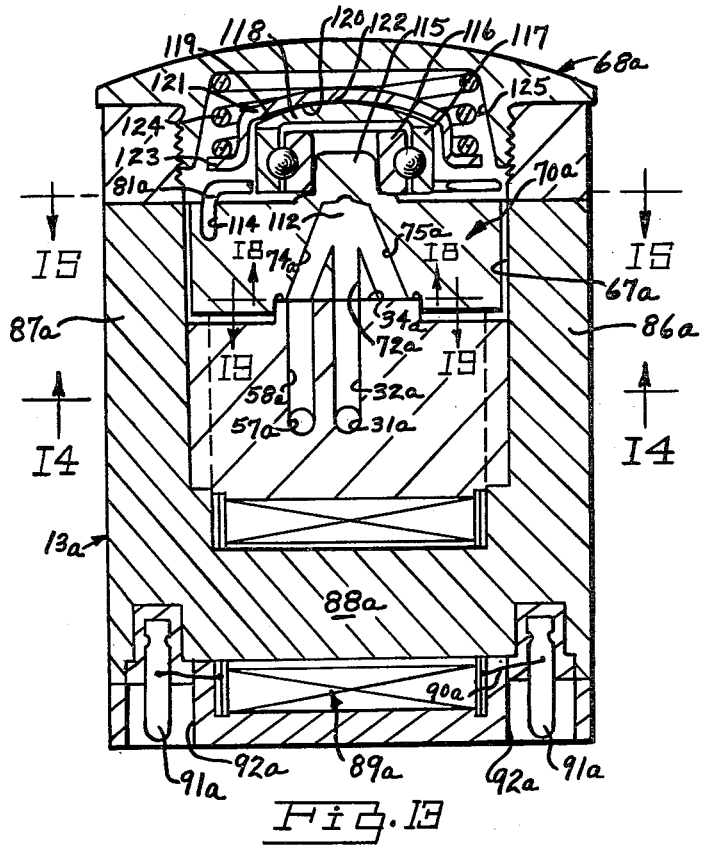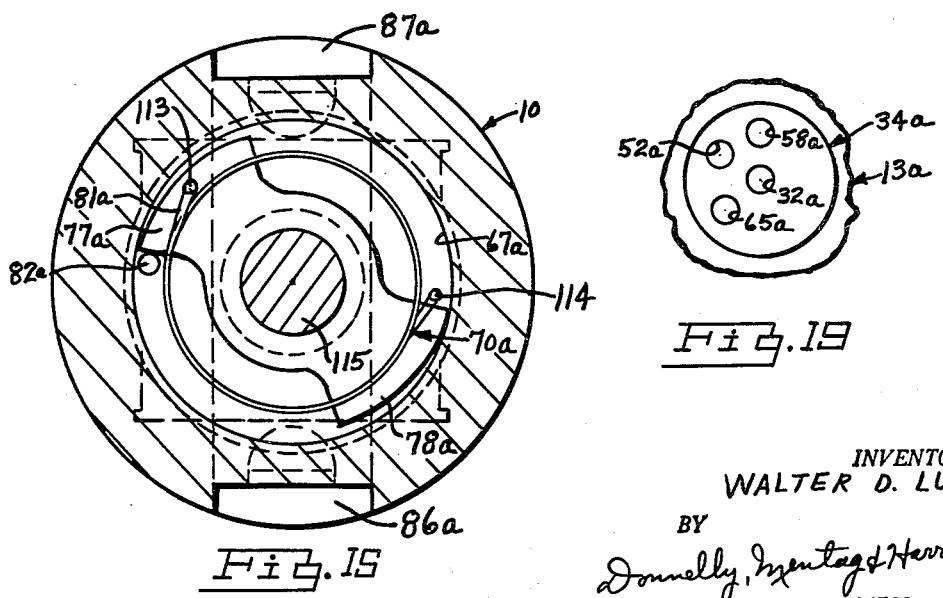

March 5, 1963 W. D. LUDWIG 3,079,951
ROTARY SOLENOID FOUR-WAY VALVE
Filed Nov. 1, 1960 6 Sheets-Sheet 5

INVENTOR.
WALTER D. LUDWIG
BY Donnelly, Mentag & Harrington
ATTORNEYS

March 5, 1963  W. D. LUDWIG  3,079,951
ROTARY SOLENOID FOUR-WAY VALVE
Filed Nov. 1, 1960  6 Sheets-Sheet 6

INVENTOR.
WALTER D. LUDWIG
BY
Donnelly, Mentag & Harrington
ATTORNEYS

United States Patent Office 3,079,951
Patented Mar. 5, 1963

3,079,951
ROTARY SOLENOID FOUR-WAY VALVE
Walter D. Ludwig, 3965 W. Lincoln Drive
Birmingham, Mich.
Filed Nov. 1, 1960, Ser. No. 66,455
16 Claims. (Cl. 137—623)

This invention relates generally to pressure fluid control valves, and, more particularly, to a novel rotary solenoid four-way pressure fluid control valve.

The prior art solenoid operated four-way pressure control valves have many inherent disadvantages which decrease their efficiency and usefulness in many instances. One disadvantage or shortcoming of the prior art valves is that they require fluid seals to prevent leakage of the fluid between the stationary and moving parts of the valve, and these fluid seals are subject to attack and deterioration by the pressure fluid being controlled by the valve and by the elements of nature. Another disadvantage of the prior art valves of the class described is that they possess a high degree of static and dynamic friction or pressure imbalance characteristics and, accordingly, require a high power input for operating the moving valve member. Other disadvantages of similar prior art valves is that they are inherently subject to self destruction through excessive impact of co-acting parts, costly to machine, large in size as compared to the pressure ranges and volume of the pressure fluid which they can control, and they are relatively inconvenient to service.

In view of the foregoing, it is an important object of the present invention to provide a four-way reversing valve of the solenoid operated type which is constructed and arranged for controlling the flow of any type of pressure fluid without the use or need of any fluid seals between the stationary and moving valve parts. The provision of a fluid valve of this type is accomplished by a novel valve seat member, a combined oscillating metallic valve and armature member, and a novel fluid porting and fluid conduit arrangement in these two members. The achievement of this novel feature of the present valve construction invention is further aided by the provision of a novel self aligning biasing means for maintaining the oscillating combination valve and armature member in constant engagement with the valve seat member while at the same time permitting relative movement between the same to provide efficient fluid flow control action.

It is another object of the present invention to provide a four-way reversing valve of the solenoid operated type which is provided with minimum static and dynamic friction characteristics, whereby a low power input is required to control a maximum flow capacity in comparison with corresponding size prior art valves. This desirable low friction characteristic is accomplished by forming the fixed valve seat member from a material having low static and dynamic friction characteristics, such as a plastic material co-acting with a metallic valve armature member. The low friction characteristics of the present valve construction are further enhanced by a novel fluid circuitry in the oscillating valve member which provides a balancing resultant fluid force on said valve member to permit oscillation of the same between the various control positions with a minimum of input power.

A further object of the present invention is the provision of a four-way reversing valve of the solenoid operated type which is economical of manufacture in that various parts thereof may be made by precision molding processes so as to reduce the overall cost thereof.

It is still another object of the present invention to produce a four-way reversing solenoid valve which is rugged, compact and simple in construction, whereby it is especially adapted to be used in multiple installations. The simplicity of the valve structure permits quick and easy servicing and replacing of the same in actual use and operation.

It is a still further object of the present invention to provide a four-way compact valve of the class described which is adapted to be formed with maximum sized orifices and to provide greater pressure ranges than the comparable prior art pressure fluid control valves.

It is another object of the present invention to provide a four-way compact valve of the class described which is relatively impervious to any applied external forces due to the novel symmetrical structure of the valve armature.

It is a further object of the present invention to provide a four-way compact valve of the class described which incorporates a valve body having a compartment in which is disposed a novel valve seat, a combined oscillating metallic valve and armature member operatively mounted on said valve seat, a glass end cap detachably mounted on said body to enclose said compartment, a piston mounted in the outer end of the armature member with one end in contact with the glass end cap, and a spring mounted in the other end of the piston and operatively engaging said armature member to maintain the same in constant engagement with the valve seat member.

It is still another object of the present invention to provide a four-way compact valve of the class described which is provided with a novel fluid porting and fluid conduit system, whereby the exterior entrance and exhaust ports may be selectively disposed on either the sides or an end of the valve body, and wherein the fluid system includes a plurality of novel check valves which also function as directional flow controls.

It is still a further object of the present invention to provide a four-way compact valve of the class described which includes a novel manifold on which the valve body may be readily and quickly mounted or removed for replacement purposes without the need for any manually operated shut-off valves for the fluid being controlled or without disturbing permanent wiring and which may be quickly and easily secured together in multiples thereof for manifolding purposes.

It is another object of the present invention to provide a four-way compact valve of the class described which incorporates a combined oscillating valve and armature member for controlling the flow of fluid through the valve and wherein said combined valve and armature member may be oscillated between operative positions by a combination of a solenoid and spring apparatus, or by a solenoid alone, and wherein the combined valve and armature member is biased into operative engagement with a valve seat by a self aligning means which may be an integral mechanical spring and piston assembly, or a combined mechanical and fluid pressure means assembly, or a spring biased ball bearing means.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a side elevational view of a rotary solenoid four-way reversing valve made in accordance with the principles of the invention;

FIG. 2 is another side elevational view of the structure illustrated in FIG. 1, taken along the line 2—2 thereof, and looking in the direction of the arrows;

FIG. 3 is a fragmentary longitudinal sectional view of the structure illustrated in FIG. 2, taken substantially along the line 3—3 thereof and looking in the direction of the arrows;

FIG. 4 is a horizontal sectional view of the structure illustrated in FIG. 3, taken along the line 4—4 thereof with the rotor removed and looking in the direction of the arrows;

FIG. 5 is a fragmentary longitudinal sectional view of the structure illustrated in FIG. 4, taken along the line 5—5 thereof and looking in the direction of the arrows;

FIG. 6 is a top view of the valve structure shown in FIG. 5, taken in the direction of the arrow marked "6" and with the cap removed;

FIG. 7 is a top view of the valve manifold structure shown in FIG. 1, taken along the line 7—7 thereof and looking in the direction of the arrows;

FIG. 8 is an elevational sectional view of the structure illustrated in FIG. 7, taken along the line 8—8 thereof and looking in the direction of the arrows;

FIG. 9 is a fragmentary elevational sectional view of the structure illustrated in FIG. 7, taken along the line 9—9 thereof and looking in the direction of the arrows;

FIG. 10 is a side elevational view of an illustrative tie bolt used to connect a plurality of valve manifolds together;

FIG. 11 is an enlarged fragmentary horizontal sectional view of the structure illustrated in FIG. 3, taken along the line 11—11 thereof and looking in the direction of the arrows;

FIG. 12 is an enlarged side elevational view of a second embodiment of the rotary solenoid four-way reversing valve of the present invention;

FIG. 13 is an elevational central sectional view of the structure illustrated in FIG. 12, taken along the line 13—13 thereof, and looking in the direction of the arrows;

FIG. 14 is a horizontal sectional view of the structure illustrated in FIG. 13, taken along the line 14—14 thereof, and looking in the direction of the arrows;

FIG. 15 is a horizontal sectional view of the structure illustrated in FIG. 13, taken along the line 15—15 thereof, and looking in the direction of the arrows;

FIG. 18 is a fragmentary horizontal sectional view of the structure illustrated in FIG. 13, taken along the line 18—18 thereof, and looking in the direction of the arrow;

FIG. 19 is a fragmentary horizontal sectional view of the structure illustrated in FIG. 13, taken along the line 19—19 thereof, and looking in the direction of the arrows;

Figure 16:
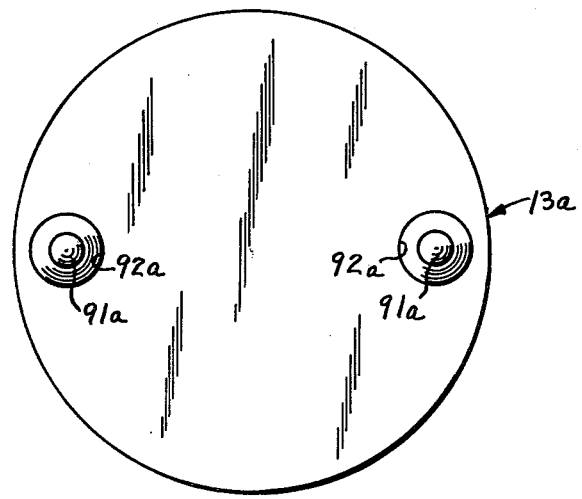
FIG. 16 is a bottom plan view of the structure illustrated in FIG. 12, taken along the line 16—16 thereof, and looking in the direction of the arrows.

Referring now to the drawings and in particular to FIGS. 1, 2, and 7, the numeral 10 generally indicates a novel valve made in accordance with the principles of the invention which is adapted to be mounted to a manifold generally indicated by the numeral 11. The numeral 12 generally indicates a conduit mounted on the side of the manifold 11 for housing the electrical lead wires for the solenoid employed in the valve 10, as more fully explained hereinafter. The numeral 13 indicates the valve body which is substantially cylindrical in overall configuration and which is made from a suitable non-magnetic material as a plastic or the like. An externally threaded mounting ring is rotatably mounted on the lower end of the valve body 13 and as adapted to meshably engage the threads in the threaded opening 15 in the manifold 11 for detachably connecting the valve 10 in the manifold. The manifold 11 is adapted to be secured in place on a control panel or the like by any suitable means as by bolts extending through bolt holes 16.

As shown in FIGS. 7 and 8, the manifold 11 is provided with a transverse bolt hole 17 which is enlarged on one end thereof as indicated by the numeral 18. As shown in FIG. 10, a tie bolt generally indicated by the numeral 19 is adapted to be inserted in the hole 17 for connecting the manifold 11 to other similar manifolds for grouping a plurality of the valves 10 together for manifolding purposes. It will be seen that the threaded end 20 of the bolt 19 is adapted to extend into the threaded recess 22 of the enlarged head 21 of a similar bolt 19 positioned in an adjacent manifold 11.

The manifold 11 is provided on opposite sides thereof with the manifold pipe ports 23 and 24 which are connected by means of the transfer passage 25. The passage 25 is connected to the threaded bore 26 which communicates at the upper end thereof with the enlarged recess 27 that opens into the threaded valve opening 15. As shown in FIG. 9, when the valve 10 is mounted in the manifold, the external passage fluid inlet port 28 communicates with the enlarged recess 27. The port 28 is at the lower end of the longitudinally extended transfer passage 29, shown in FIG. 4, which connects at the upper end thereof with the external cavity 30 on the side of the body 13. The port 30 connects with the transverse transfer passage 31 which in turn is connected to the axial transfer passage 32. The transfer passage 32, as shown in FIG. 5, extends to the internal port 33 formed on the valve seat 34.

As shown in FIG. 9, a check valve generally indicated by the numeral 35 is threadably mounted in the bore 26 in the manifold 11. The check valve 35 is provided with the check ball 36 which is biased into the closing position by means of the spring 37. It will be seen that when the valve body 13 is mounted in the manifold 11, the projection 38 on the bottom of the valve body 13 will extend through the opening 39 in the valve 35 and unseat the check ball 36 to permit fluid under pressure to pass from the passage 25 and through the check valve and into the passage 29. It will be understood that the thread on the mounting collar 14 is designed in conjunction with the length of the projection 38 so that the check ball is not unseated until the ring 14 pulls the valve body 13 into engagement against the sealing means 40 in the recess 27 to prevent leakage of pressure fluid from the manifold during the mounting action of the valve in the manifold 11. The reverse action will take place when the valve 10 is removed from the manifold 11. As shown in FIG. 4, a similar check valve 41 is mounted in the cavity 30 but this check valve has the ball and spring removed therefrom so that it merely acts as a plug for the external cavity 30 while it permits free flow in the internal passages.

As shown in FIG. 7, the manifold 11 is provided with a pipe port as 42 and 43 on opposite sides thereof, and these ports are connected by the transverse fluid passage 44. The ports 42 and 43 are exhaust ports which may be connected by suitable piping or to adjacent manifolds and thence to a storage tank or the atmosphere. As shown in FIGS. 5 and 7, the passage 44 is connected by the passage 45 which terminates at an enlarged portion that it filled with suitable sealing means as 46. FIG. 1 shows passage 45 communicating with the external exhaust port 47 at the lower end of the transfer passage 48 in the valve body 13. Passage 48 extends longitudinally in the body 13 up to the external cavity 49 as shown in FIG. 4. The cavity 49 is enclosed by means of a plug 50 which is constructed similar to the check valve 41 and is used to perform the same function as in cavity 30. The internal cavity 49 is connected by means of the transfer passage 51 to the passage 52 which terminates with a port in the valve seat 34.

The manifold 11 is provided with a first cylinder external port 53, as shown in FIG. 7, which communicates by means of the passages 54 and 55 with the external cavity 56. The cavity 56 communicates by means of the passage 57 with the passage 58 which in turn terminates in a port in the valve seat 34 as shown in FIG. 4. The cavity 56 has mounted therein a check valve 59 which is constructed identically to the check valve 35 and which functions in this instance as an adjustable speed control to permit free flow of fluid therethrough to the cylinder port 53, and permits a variable return of the fluid. As shown in FIG. 7, the numeral 60 indicates a second external cylinder port which is connected by means of the passages 61 and 62 to the external cavity 63 as shown in FIG. 4. The cavity 63 is connected by means of the passage 64 to the passage 65 which terminates in a port formed in the valve seat 34. A check valve 66 is mounted in the cavity 63 and is identical to the check valve 59 and also functions as a speed control in the same manner.

As shown in FIGS. 3 and 5, the valve seat 34 extends into the cylindrical compartment 67 which is formed in the outer end of the cylinder body 10 and which is enclosed by the threadably mounted upper end cap 68 which is more fully described hereinafter. A combined oscillating solenoid armature and directional control valve member, generally indicated by the numeral 70, is mounted in the compartment 67 and is operatively seated on the valve seat 34. The armature member 70 includes the integral insert 69 which is preferably made from a stainless steel and which is provided with the cylindrical chamber 71 which extends inwardly from the outer side thereof. As shown in FIG. 5, an axial bore 72 is formed through the inner side of the insert 69 and this bore communicates with the port 33. A pilot tube 73 is mounted in the hub bore 72 and extends into the passage 33 and functions as a pivot means for the armature member 70. The pilot tube 73 is provided with a flange on the outer end thereof which is seated in the bottom of the cylindrical chamber 71. As shown in FIGS. 5 and 11, the cylindrical chamber 71 communicates by means of the transfer passage 74 with the port at the upper end of the passage 58 in the valve seat 34 when the valve member is in the position shown in FIG. 6. A similar passage 75 communicates the cylindrical chamber 71 with the surface of the valve seat 34 when the valve armature 70 is in the position shown in FIG. 6. As shown in FIG. 11, the valve armature member 70 is provided on the lower side thereof with an arcuate transfer slot or recess 76 which is adapted to alternately connect the cylinder passages 58 and 65 with the exhaust passage 52, as more fully described hereinafter.

As shown in FIG. 6, the armature member 70 is provided with oppositely disposed outwardly extended arms 77 and 78, the outer ends of which are arcuately tapered as indicated by the numerals 79 and 80, respectively. The armature member 70 is made from a suitable magnetic iron. As shown in FIG. 6, a return spring 81 of 1½ turns is adapted to normally maintain the valve armature member 70 in the position shown in FIG. 6 against the stop pin 82. The one end 83 of the return spring 81 is seated in a suitable hole in the bottom wall of the compartment 67 and the other end 84 of the spring is adapted to abut the valve arm 77.

It will be seen that when the valve armature member 70 is in the position shown in FIG. 6, the transfer passage 74 in the valve armature member 70 will be aligned with the normally open cylinder supply passage 58 so as to supply pressure fluid to the external port 53, shown in FIG. 7, through the cylindrical chamber 71 which operates as a transfer passage. The arcuate transfer slot 76 will at the same time connect the cylinder supply passage 65 with the exhaust passage 52, whereby the external cylinder port 60, shown in FIG. 7, is connected to the exhaust port 42. When the valve armature member 70 is rotated clockwise in response to the electrically generated magnetic field, as viewed in FIG. 6, the valve armature member 70 will move until it enters in a neutral position indicated by the dotted line position 85. The valve armature member 70 will then be in what can be termed an "advanced" or second position as compared to the solid line position of valve armature member 70 in FIG. 6 which may be termed a "retracted" or first position. When the valve armature member 70 is in the "advanced" position, the transfer passage 75, shown in FIG. 11, will connect the pressure fluid source to the passage 65, shown in FIG. 4, for supplying pressure fluid to the normally closed external port 60 of FIG. 7. Simultaneously, the arcuate transfer slot 76 will connect the passage 58 with the external port 53 of FIG. 7 so as to connect the normally open cylinder port 53 with the exhaust port 43. The valve armature member 70 is adapted to be moved to the aforementioned "advanced" position by means of an electro-magnet and to be moved to the retracted position by means of the return spring 81.

The electro-magnet comprises the poles 86 and 87 which are oppositely disposed in the periphery of the valve body 13, as shown in FIGS. 3 and 4. The electro-magnet with the poles 86 and 87 is positioned and molded in the body 13. The numeral 88 indicates the solenoid core portion of the magnet. The numeral 89 indicates a suitable conventional solenoid coil wound around the core 88 and positioned in the bottom of the valve body 13.

The solenoid coil 89 is connected at each end, as shown in FIGS. 3 and 5, by the internal leads 90 to the two terminals 91 which extend through the stepped holes 92 formed in the lower end of the molded valve body 13. As shown in FIG. 7, the terminals 91 are adapted to be aligned with the holes 93 and 94 in the manifold 11, whereby these terminals may be engaged with suitable electrical lead connectors positioned in the holes 93 and 94 when the valve 10 is mounted to the manifold 11. The electrical leads connected to the aforementioned solenoid terminals would pass through the bore 95 into the compartment 96 in the conduit 12. As shown in FIG. 2, the conduit 12 is provided with the openings 97 and 98 at the ends thereof for communication with similar manifolds when these valves are grouped together. The conduit 12 is provided with the service opening 99 on the side thereof, and this opening is enclosed by the cover plate 100 which is secured in place by the screws 101 and 102. As shown in FIGS. 2 and 7, the conduit 12 is adapted to be connected to the manifold 11 by means of the internal screws 103 which are threadably mounted in the holes 104 in the manifold 11.

The end cap 68 includes the metal collar or ring 105 which supports a transparent circular plate 106 which is adapted to be seated inside of the chamber 67 and to be made from any suitable transparent material as glass or the like. The transparent circular plate 106 is retained in place by the metal collar or ring 105 which is threadably mounted on the exterior threads 107 formed on the upper outer periphery of the body 13.

As shown in FIG. 5, the valve armature 70 is provided with the upwardly extended centrally disposed hub formed by insert 69 in which is formed the cylindrical chamber 71. A piston 108 is mounted in the cylindrical chamber 71 and the upper or outer end thereof is provided with a convexly curved surface which abuts the lower or inner surface of the circular plate 106 in a point contact. The piston 108 is provided with a suitable O-ring sealing means 109 and this piston 108 is adapted to turn with the rotor or valve armature 70 during operation of the valve. A recess 110 is formed in the lower end of the piston 108 and receives the upper end of the spring 111. As shown in FIG. 5, the lower end of the spring 111 abuts the end of the pilot tube 73 in the cylindrical chamber 71, whereby the spring 111 maintains an initial and constant force on the valve armature 70 to bias it downwardly into operative engagement with the valve seat 34. The piston 108 does not move up or down during operation of the valve but maintains its point bearing contact with the transparent plate 106. The piston 108 may be made from any non-corrosive substance as stainless steel or a suitable plastic material. It will be seen that the transparent glass plate 106 serves as an ideal bearing for engagement with the piston 108 and it also permits visual observation of the operations of the valve.

It will be seen that the transfer passages in the valve armature 70 communicate with the inner end of the cylindrical chamber 71. When the valve is transferring fluids at varying pressures, a proportionately greater differential in pressure is constantly maintained to overcome the force tending to separate the valve armature from its seat. The aforedescribed operative construction of the valve 10 eliminates the need for exact or close tolerances between the moveable valve armature 70 and the stationary retaining collar or ring 105 and provides a bearing means therebetween with minimal friction characteristics.

Figure 17:
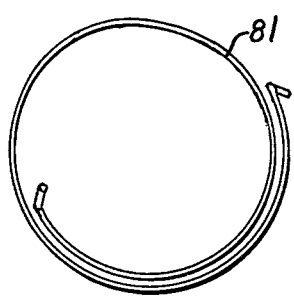
FIG. 17 is a top plan view of the solenoid armature return spring employed in the invention.

It will also be seen that the aforedescribed self-aligning mechanical and fluid pressure means continuously biases the valve armature 70 into operative seating engagement with the valve seat 34. It will also be apparent that the transfer passage 75 in the valve armature 70 will direct pressure fluid against the top of the valve seat 34 so as to balance the pressure fluid acting in the transfer passage 74 and so maintains the equilibrium of the valve armature 70 relative to the valve seat 34. The aforedescribed self compensating fluid pressure balancing of the valve armature 70 functions to provide relatively uniform friction characteristics throughout varying pressure ranges with a structure which obviates the need of maintaining closely held manufacturing tolerances. It will be seen that when the solenoid coil 89 is energized from a suitable source of electrical current, that the valve armature 70 will be rotated clockwise as viewed in FIG. 6, to a second position 85, shown in dotted lines, between poles 86 and 87 and that when the solenoid coil 89 is de-energized, the return spring 81 will return the valve armature member 70 to the first position shown in solid lines in FIG. 6. FIG. 17 illustrates the return spring 81 in the free state.

The operation of a conventional rotary or stalled motor type solenoid in the valve is well known and can be understood by viewing the structure as shown in FIG. 6. The valve armature 70 is formed from magnetic iron and, accordingly, when the solenoid coil 89 is energized, the valve armature 70 will be moved clockwise as viewed in FIG. 6 until it is aligned with the poles 86 and 87. As shown in FIG. 6, one of the sides of each of the arms 78 and 79 overlap the poles 86 and 87 when the valve armature 70 is in the inoperative position so as to place these arms partially in the magnetic flux field when it is initially created by the electrical energization of the coil 89. The arcuate tapering of the outside ends of the armature arms is a unique deviation from the conventional and is calculated to bring a uniform balance to the tendency of the generated magnetic torque to diminsh as the spring load increases.

FIGS. 12 through 19 illustrate a second embodiment of the invention the use of which may be preferable when pressure ranges are not great. In this second embodiment of a self aligning spring biased ball bearing means is utilized for maintaining the armature member on the valve seat. The parts of the second embodiment which are the same as in the first embodiment are marked with corresponding reference numerals followed by the small letter "a." In this second embodiment the external periphery cavities 30a, 49a, 56a, and 63a have the check valves removed and they are threaded to form ports, and in use the ports 30a and 49a are connected to the device to be supplied with pressure fluids as, for example, the opposite ends of a fluid cylinder for supplying and exhausting pressure fluid to and from the ends of the fluid cylinder. The pressure fluid inlet port 30a would be connected in use by any suitable means to a conventional pressure fluid supply source. The exhaust port 49a may exhaust the pressure fluid to a return tank or to the atmosphere in accordance with the type of fluid being controlled, as desired.

As shown in FIG. 13 numerals 74a and 75a indicate a pair of transfer passages formed in the valve and armature member 70a, and these passages taper inwardly and upwardly from diametrically oppositely disposed positions on each side of the passage 72a. The transfer passages 74a and 75a meet with the passage 72a at the juncture point 112 in the valve member 70a. As shown in FIG. 15, the valve armature member 70a is provided with the oppositely disposed outwardly extended integral arms 77a and 78a, the outer ends of which are arcuately tapered. As shown in FIG. 15, the one end of the return spring 81a is seated in the hole 113 in the arm 77a and the other end is seated in the hole 114 in the body 13a.

As shown in FIG. 13, the valve armature 70a is provided on the upper end thereof with the stub shaft 115 which is centrally disposed and extends upwardly from the main body of the valve armature. A first or inner ball bearing retainer ring 116 is operatively mounted on the stub shaft 115. A second or outer ball bearing retainer ring 117 is operatively mounted on the first retainer ring 116. A disc thrust bearing 118 is floatably mounted on the upper end of the bearing retainer ring 117 and has an upper convexly curved surface 119 formed to a first radius. The disc thrust bearing 118 is operatively seated against the inner or lower mating concavely curved surface 120 of the spring cap 121. The inner curved surface 120 on the spring cap 121 is formed to a larger radius than the radius of the curved surface 119 on the disc thrust bearing 118, whereby a central point of contact, as indicated by the numeral 122, will be maintained between the spring biased cap 121 and the disc thrust bearing 118 so as to provide a floatably balanced axial thrust downwardly on the valve armature 70a to maintain it in constant engagement with the valve seat 34a at all times and across all of the mating areas therebetween. The spring cap 121 is provided with the flange 123 around the lower edge thereof which is operatively engaged by the lower end of the coil spring 124 for maintaining a desired predetermined spring pressure on the spring cap 121. The upper end of the spring 124 is adapted to engage the upper end of the recess 125 which is formed in the valve body end cap 68a. The armature 70a is operated in the same manner as the first embodiment.

Figure 20:
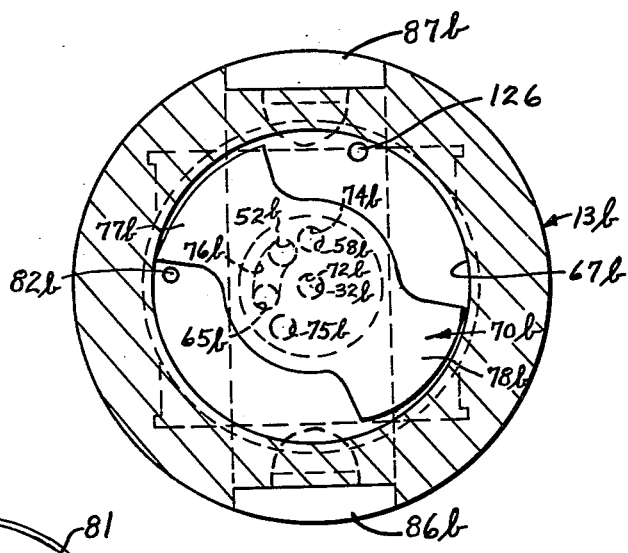
FIG. 20 is a horizontal sectional view similar to FIG. 15, of a third embodiment of the invention.

FIG. 20 illustrates a third embodiment of the invention, in which the valve armature 70b is formed with permanent north and south poles. The physical structure of the third embodiment shown in FIG. 20 is the same as that for the second embodiment and the corresponding parts have been marked with similar numerals followed by the small letter "b." In the third embodiment of FIG. 20, the return spring 81 is deleted and the valve armature 70b is rotated between the aforementioned first and second positions by solenoid action. For example, if the armature arm 77b is a permanent north pole and the armature arm 78b is a permanent south pole, the valve armature 70b would be rotated to the first position as shown in FIG. 20 by energizing the solenoid coil 89 with direct current to produce a north pole in the pole 87b and a south pole in the pole 86b. The fixed poles, being of opposite polarity to the adjacent movable poles, will cause a repelling action therebetween to rotate the valve armature 70b counterclockwise as viewed in FIG. 20 to the first position as shown therein. When the direct current in the solenoid coil 89 is reversed by any suitable switching means, the pole 87b would change to a south pole and the pole 86b to a north pole, whereby the adjacent movable poles will be attracted thereto and the valve armature 70b will be rotated clockwise, as viewed in FIG. 20, to the second position in alignment with the poles 86b and 87b. It will be seen from FIG. 20 that when the valve armature 70b is moved to the second position, it will not be fully aligned or centered between the poles 87b and 86b. This offset second position, as well as the arcuately tapered arms of the armature 70b, provides a positive repulsion action between the fixed and movable magnetic poles. In order to stop the valve armature 70b in the aforedescribed second position, a stop pin 126 is mounted in the body compartment 67b. It will thus be seen that in the third embodiment, the travel of the valve armature 70b is shortened between the first and second positions, and accordingly, the ports and transfer passages in the valve seat and valve armature have been moved to register properly.

Figure 21:
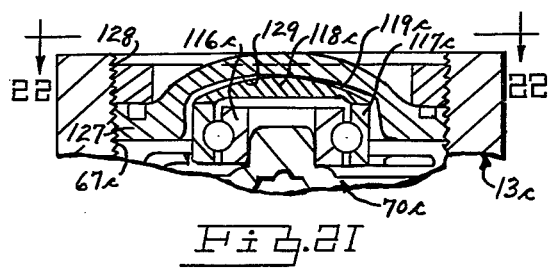
FIG. 21 is a fragmentary elevational central sectional view of the upper end of a fourth embodiment of the invention showing a modified end cap and armature self-alignment apparatus.
Figure 22:
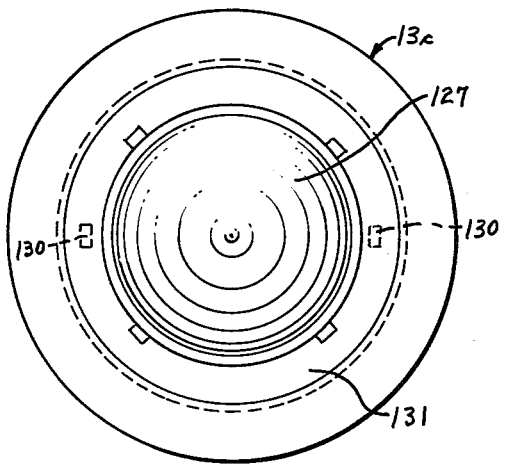
FIG. 22 is a top plan view of the structure illustrated in FIG. 21, taken along the line 22—22 and looking in the direction of the arrows.

FIGS. 21 and 22 illustrate a fourth embodiment or further modified valve made in accordance with the invention. The structure which is similar to the second embodiment is marked with corresponding reference numerals followed by the small letter "c." This embodiment is adapted for use when it is necessary to maintain positive armature equilibrium should the valve be subjected to external gravitational forces as in missile applications. The fixed position of the end cap maintains a static positioning of the valve armature 70c on its seat. In this embodiment the end cap 127 comprises a metal enclosure which is threaded on the periphery thereof whereby it may be threadably engaged with the internal threads 128 formed in the outer end of the compartment inner surface 67c. As shown in FIG. 21, the central inner surface of the end cap 127 is formed concave upwardly as indicated by the numeral 129 and to a radius larger than that for forming the curved upper surface 119c on the disc bearing 118c. The end cap 127 may be adjusted to eliminate axial end play of the armature member 70c by means of a suitable wrench engaging the holes 130 formed in the outer surface of the cap 127, and locked in position by any suitable means, as by the lock ring 131. This fourth embodiment functions in the same manner as the second embodiment.

Figure 23:
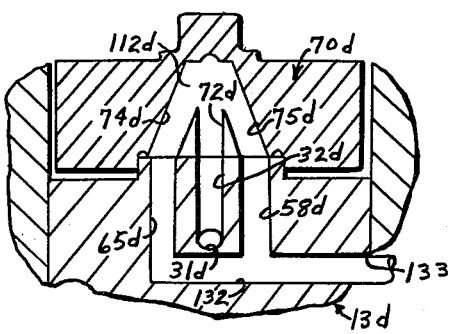
FIG. 23 is a fragmentary elevational central sectional view of a valve armature and valve seat structure employed in the invention and showing a modified fluid internal porting arrangement to provide an "ON-OFF" valve; and, FIG. 24 is a top view of the valve seat structure of FIG. 23 and showing the valve armature ports in dotted lines.
Figure 24:
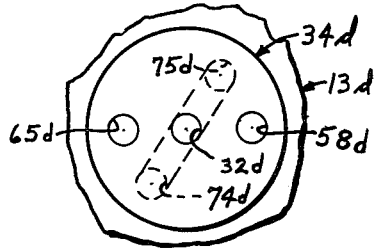

FIGS. 23 and 24 illustrate a valve made in accordance with the principles of the present invention and which is provided with a modified fluid passage arrangement in the valve body to provide an ON-OFF valve. The parts of the structure which are similar to those of the second embodiment are marked with corresponding reference numerals followed by the small letter "d." In this embodiment the passages 58d and 65d are connected by means of the passage 132 to a common outlet passage 133. The transfer passages 74d and 75d are indicated by dotted lines in FIG. 24 and it will be seen that when the valve armature 70d is oscillated back and forth, the valve will act as an ON-OFF valve to permit fluid entering the valve through passage 32d to be exhausted out through both of the passages 58d and 65d. The valve armature 70d of this embodiment functions in the same manner as the corresponding structure of the second embodiment. It will be understood that an "ON-OFF" control valve action may be obtained equally well by merely blocking off one of the cylinder supply ports, as 56 or 63, so as to close one of the passages 58 or 65, respectively.

It is readily apparent from the rotary symmetrical structure of the valve armature employed in the present invention that it is relatively impervious to external forces.

While it will be apparent that the preferred embodiments of the invention herein disclosed are well calculated to fulfill the objects above stated, it will be appreciated that the invention is susceptible to modification, as other arrangements of porting, as well as other variations and changes, without departing from the proper scope or fair meaning of the subjoined claims.

What I claim is:

1. A four-way reversing valve of the class described comprising: a valve body; a compartment formed in one end of the body; a cap releasably mounted on said one end of the body and enclosing said compartment; a valve seat formed at the inner end of said compartment; a first set of external fluid ports formed in said body, including a pressure fluid inlet port, an exhaust port, a normally open cylinder supply port, and a normally closed cylinder supply port; a second set of internal fluid ports formed in said valve seat, including a pressure fluid inlet port, an exhaust port, a normally open cylinder supply port, and a normally closed cylinder supply port; a plurality of fluid transfer passages in said body connecting the similarly named ports in both of said sets of ports; a rotatable valve armature mounted on said valve seat and being provided with fluid transfer passages whereby, when the valve armature is in a first position, the fluid transfer passages in the valve armature will connect the pressure fluid inlet port in the valve seat to the normally open cylinder supply port in the valve seat, and, the normally closed cylinder supply port in the valve seat to the exhaust port in the valve seat, and, when the valve armature is rotated to a second position, the connections of the cylinder supply ports to the pressure fluid inlet port and exhaust port will be reversed relative to the aforementioned first valve armature position connections; and, power means for selectively oscillating the valve armature between said first and second positions.

2. A four-way reversing valve of the class described comprising: a valve body; a compartment formed in one end of the body; a cap releasably mounted on said one end of the body and enclosing said compartment; a valve seat formed at the inner end of said compartment; a first set of external fluid ports formed in said body, including a pressure fluid inlet port, an exhaust port, a normally open cylinder supply port, and a normally closed cylinder supply port; a second set of internal fluid ports formed in said valve seat, including a pressure fluid inlet port, an exhaust port, a normally open cylinder supply port, and a normally closed cylinder supply port; a plurality of fluid transfer passages in said body connecting the similarly named ports in both of said sets of ports; a rotatable valve armature mounted on said valve seat and being provided with fluid transfer passages whereby, when the valve armature is in a first position, the fluid transfer passages in the valve armature will connect the pressure fluid inlet port in the valve seat to the normally open cylinder supply port in the valve seat, and, the normally closed cylinder supply port in the valve seat to the exhaust port in the valve seat, and, when the valve armature is rotated to a second position, the connections of the cylinder supply ports to the pressure fluid inlet port and exhaust port will be reversed relative to the aforementioned first valve armature position connections; self-aligning mechanical means for maintaining said valve armature in engagement with said valve seat; and, power means for selectively oscillating the valve armature between said first and second positions.

3. A four-way reversing valve of the class described comprising: a valve body; a compartment formed in one end of the body; a cap releasably mounted on said one end of the body and enclosing said compartment; a valve seat formed at the inner end of said compartment; a first set of external fluid ports formed in said body, including a pressure fluid inlet port, an exhaust port, a normally open cylinder supply port, and a normally closed cylinder supply port; a second set of internal fluid ports formed in said valve seat, including a pressure fluid inlet port, an exhaust port, a normally open cylinder supply port, and a normally closed cylinder supply port; a plurality of fluid transfer passages in said body connecting the similarly named ports in both of said sets of ports; a rotatable valve armature mounted on said valve seat and being provided with fluid transfer passages whereby, when the valve armature is in a first position, the fluid transfer passages in the valve armature will connect the pressure fluid inlet port in the valve seat to the normally open cylinder supply port in the valve seat, and, the normally closed cylinder supply port in the valve seat to the exhaust port in the valve seat, and, when the valve armature is rotated to a second position, the connections of the cylinder supply ports to the pressure fluid inlet port and exhaust port will be reversed relative to the aforementioned first valve armature position connections; self-aligning mechanical and fluid pressure means for maintaining said valve armature in engagement with said valve seat; and, power means for selectively oscillating the valve armature between said first and second positions.

4. A four-way reversing valve of the class described comprising: a valve body; a compartment formed in one end of the body; a cap releasably mounted on said one end of the body and enclosing said compartment; a valve seat formed at the inner end of said compartment; a first set of external fluid ports formed in said body, including a pressure fluid inlet port, an exhaust port, a normally open cylinder supply port, and a normally closed cylinder supply port; a second set of internal fluid ports formed in said valve seat, including a pressure fluid inlet port, an exhaust port, a normally open cylinder supply port, and a normally closed cylinder supply port; a plurality of fluid transfer passages in said body connecting the similarly named ports in both of said sets of ports; a rotatable valve armature mounted on said valve seat; said armature being provided with fluid transfer passages, and, an integral mechanical spring and piston assembly for maintaining said valve armature in engagement with said valve seat whereby when the valve armature is in a first position, the fluid transfer passages in the valve armature will connect the pressure fluid inlet port in the valve seat to the normally open cylinder supply port in the valve seat, and, the normally closed cylinder supply port in the valve seat to the exhaust port in the valve seat, and, when the valve armature is rotated to a second position, the connections of the cylinder supply ports to the pressure fluid inlet port and exhaust port will be reversed relative to the aforementioned first valve armature position connections.

5. A four-way reversing valve of the class described comprising: a valve body; a compartment formed in one end of the body; a cap releasably mounted on said one end of the body and enclosing said compartment; a valve seat formed at the inner end of said compartment; a first set of external fluid ports formed in said body, including a pressure fluid inlet port, an exhaust port, a normally open cylinder supply port, and a normally closed cylinder supply port; a second set of internal fluid ports formed in said valve seat, including a pressure fluid inlet port, an exhaust port, a normally open cylinder supply port, and a normally closed cylinder supply port; a plurality of fluid transfer passages in said body connecting the similarly named ports in both of said sets of ports; a rotatable valve armature mounted on said valve seat; said armature being provided with fluid transfer passages, and, an integral mechanical spring and piston assembly for maintaining said valve armature in engagement with said valve seat whereby when the valve armature is in a first position, the fluid transfer passages in the valve armature will connect the pressure fluid inlet port in the valve seat to the normally open cylinder supply port in the valve seat, and, the normally closed cylinder supply port in the valve seat to the exhaust port in the valve seat, and, when the valve armature is rotated to a second position, the connections of the cylinder supply ports to the pressure fluid inlet port and exhaust port will be reversed relative to the aforementioned first valve armature position connections; and, electrical power means for selectively oscillating the valve armature between said first and second positions.

6. The four-way reversing valve as defined in claim 5, wherein: said external ports are located on one of the ends of the valve body.

7. The four-way reversing valve as defined in claim 5, wherein: said external ports are located on the sides of the valve body.

8. The four-way reversing valve as defined in claim 5, wherein: a combination check and flow control valve is operatively mounted in each of the fluid transfer passages connected to the external cylinder supply ports for controlling the rate of flow of fluid to the cylinders for controlling the speed of operation of the cylinders.

9. A four-way reversing valve of the class described comprising: a valve body; a compartment formed in one end of the body; a cap releasably mounted on said one end of the body and enclosing said compartment; a valve seat formed at the inner end of said compartment; a first set of external fluid ports formed in said body, including a pressure fluid inlet port, an exhaust port, a normally open cylinder supply port, and a normally closed cylinder supply port; a second set of internal fluid ports formed in said valve seat, including a pressure fluid inlet port, an exhaust port, a normally open cylinder supply port, and a normally closed cylinder supply port; a plurality of fluid transfer passages in said body connecting the similarly named ports in both of said sets of ports; a rotatable valve armature mounted on said valve seat; said armature being provided with fluid transfer passages, and, an integral mechanical spring and piston assembly for maintaining said valve armature in engagement with said valve seat whereby when the valve armature is in a first position, the fluid transfer passages in the valve armature will connect the pressure fluid inlet port in the valve seat to the normally open cylinder supply port in the valve seat, and, the normally closed cylinder supply port in the valve seat to the exhaust port in the valve seat, and, when the valve armature is rotated to a second position, the connections of the cylinder supply ports to the pressure fluid inlet port and exhaust port will be reversed relative to the aforementioned first valve armature position connections; electrical power means for selectively oscillating the valve armature between said first and second positions; said external ports being located on one of the ends of the valve body; a manifold; means for detachably mounting said valve in said manifold; an exhaust port, a pressure fluid supply port and a plurality of cylinder supply ports in said manifold; and, said manifold being provided with fluid transfer passages for operatively connecting said external ports in said valve to the similarly named ports in said manifold.

10. The four-way reversing valve structure as defined in claim 9, wherein: a fluid shut-off valve is mounted in the pressure fluid supply transfer passage in said manifold, and, said valve body is provided with a shut-off valve actuating means whereby, when said valve body is mounted on said manifold, said valve actuating means will open said shut-off valve and when said valve body is detached from said manifold, said valve actuating means will be withdrawn and the shut-off valve will automatically close.

11. The four-way reversing valve structure as defined in claim 9, wherein: said manifold is provided with attachment means for detachably connecting the manifold to similar manifolds for grouping a plurality of valve structures together.

12. The four-way reversing valve structure as defined in claim 9, wherein: an electrical conduit is detachably connected to said manifold for conveying electrical power leads from an electrical power source to said electrical power means, and said electrical conduit is provided with entrance ports at each end thereof for connecting a plurality of the same when a plurality of said manifolds are connected in a group.

13. A four way reversing valve of the class described comprising: a valve body; a compartment formed in one end of the body; a cap releasably mounted on said one end of the body and enclosing said compartment; a valve seat formed at the inner end of said compartment; a first set of external fluid ports formed in said body, including a pressure fluid inlet port, an exhaust port, a normally open cylinder supply port, and a normally closed cylinder supply port; a second set of internal fluid ports formed in said valve seat, including a pressure fluid inlet port, an exhaust port, a normally open cylinder supply port, and a normally closed cylinder supply port; a plurality of fluid transfer passages in said body connecting the similarly named ports in both of said sets of ports; a rotatable valve armature mounted on said valve seat; said armature being provided with fluid transfer passages; including a communicating piston cylinder having an open end facing said cap; a piston in said cylinder; a spring means in said cylinder normally biasing said piston in one direction against said cap and normally biasing said armature in the other direction against said valve seat; whereby when the valve armature is in a first position, the fluid transfer passages in the valve armature will connect the pressure fluid inlet port in the valve seat to the normally open cylinder supply port in the valve seat, and, the normally closed cylinder supply port in the valve seat to the exhaust port in the valve seat, and, when the valve armature is rotated to a second position, the connections of the cylinder supply ports to the pressure fluid inlet port and exhaust port will be reversed relative to the aforementioned first valve armature position connections; and, electrical power means for selectively oscillating the valve armature between said first and second positions.

14. The four-way reversing valve structure defined in claim 13, wherein: said armature is provided with a tubular pilot which extends therefrom and is rotatably mounted in said valve seat.

15. The four-way reversing valve structure defined in claim 13, wherein: the end cap is provided with a transparent portion for visual inspection of the valve armature without removing the cap.

16. A four-way reversing valve of the class described comprising: a valve body; a compartment formed in one end of the body; a cap releasably mounted on said one end of the body and enclosing said compartment; a valve seat formed at the inner end of said compartment; a pressure fluid supply external port in said valve body; a pressure fluid supply internal port in said valve seat; a first fluid transfer passage in said valve body connecting said fluid supply ports; at least one internal fluid supply port in said valve seat; at least one external fluid supply port in said valve body; a second fluid transfer passage in said body connecting said fluid supply ports; a rotatable valve armature mounted on said valve seat and being provided with fluid transfer passages whereby, when the valve armature is in a first position, the fluid transfer passages in the valve armature will connect the pressure fluid inlet port in the valve seat to the supply port in the valve seat, and, when the valve armature is rotated to a second position, the connections of the supply port to the pressure fluid inlet port will be reversed relative to the aforementioned first valve armature position connections; self-aligning mechanical and fluid pressure means for maintaining said valve armature in engagement with said valve seat; and, power means for selectively oscillating the valve armature between said first and second positions.

References Cited in the file of this patent
UNITED STATES PATENTS

| | | |
|---|---|---|
| 2,827,924 | Towler et al. | Mar. 25, 1958 |
| 2,988,108 | Malmquist et al. | June 13, 1961 |